Nov. 4, 1952 C. J. H. A. STAAL 2,616,977

PULSE MULTIPLEX COMMUNICATION SYSTEM

Filed Feb. 15, 1949 2 SHEETS—SHEET 1

INVENTOR.
CORNELIS JOHANNES HENRICUS ANTONIUS STAAL
BY [signature]
AGENT

Nov. 4, 1952 C. J. H. A. STAAL 2,616,977

PULSE MULTIPLEX COMMUNICATION SYSTEM

Filed Feb. 15, 1949 2 SHEETS—SHEET 2

INVENTOR.
CORNELIS JOHANNES HENRICUS ANTONIUS STAAL
BY Fred M Vogel
AGENT.

Patented Nov. 4, 1952

2,616,977

UNITED STATES PATENT OFFICE 2,616,977

PULSE MULTIPLEX COMMUNICATION SYSTEM

Cornelis Johannes Henricus Antonius Staal, Eindhoven, Netherlands, assignor to Hartford National Bank and Trust Company, Hartford, Conn., as trustee Application February 15, 1949, Serial No. 76,432
In the Netherlands March 5, 1948

10 Claims. (Cl. 179—15)

Figure 1:
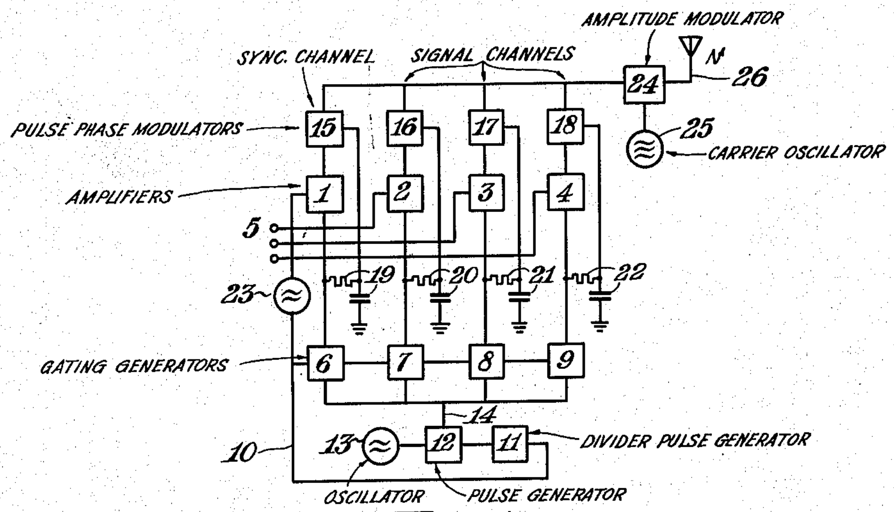

The invention relates to a communication system and to transmitters and receivers for use in it, in which intelligence signals (for example television, telephony and telegraph signals) and synchronizing pulses occurring in the rhythm of the so-called cycle frequency are alternately transmitted.

The invention may be applied with particular advantage to systems for multiplex in time partition, in which a series of signal pulses characterizing a plurality of intelligence signals by their places or their duration and a synchronizing pulse are transmitted in each transmission cycle.

At the receiver end of such a system use is frequently made of a generator which is required to be synchronized by the synchronizing pulses and to which the synchronizing pulses are fed through a synchronizing channel which is operative during each synchronizing period.

In order to permit of separating signal pulses and synchronizing pulses at the receiver end, the synchronizing pulses are known to be made of longer duration than the signal pulses. However, this is inconvenient in pulse-phase modulation systems, for example in view of repeater stations. In order to obviate this disadvantage, it has already been suggested to constitute a synchronizing pulse by two or three immediately successive pulses, the component pulses each corresponding in duration and amplitude to the signal pulses.

In both cases mentioned above the transmission energy required for radiation of synchronizing pulses is comparatively high and this can be mitigated, as has been suggested before, by causing one or more of the pulses required to be transmitted to be modulated by a discerning signal of any frequency.

According to the invention, provision is made at the transmitter end of means for causing the synchronizing pulses to be modulated by a frequency which is a subharmonic of the cycle frequency and exceeds the highest frequency of the intelligence signals to be transmitted, whereas at the receiver end the synchronizing pulses in the synchronizing channel are fed to a selective circuit which is tuned to a subharmonic of the cycle frequency and the output voltage of which serves to synchronize the generator to be synchronized with the cycle frequency.

In a multiplex transmitter in which intelligence signals are transmitted by phase modulation or pulses, use is preferably made of phase-modulated synchronizing pulses.

The modulation frequency of the synchronizing pulses preferably corresponds to half the cycle frequency.

The following advantages may thus be realized in conjunction:

1. The energy required for the transmission of synchronizing pulses can be reduced to a minimum.

2. The equality in duration and amplitude of synchronizing and signal pulses renders the construction of the repeater stations particularly simple.

3. The pulse recurrence frequency which is required for a reasonable transmission quality and which is approximately three times the highest frequency of the intelligence signals to be transmitted always permits of using a modulation of the synchronizing pulses by half the cycle frequency and of preventing synchronization at the receiver end from being affected by intelligence signals with the use of simple selective means.

4. Cross-talk through the synchronizing channel does not occur in practice.

5. Signalling may be effected in any channel by suppressing pulses or using a momentarily modified pulse recurrence frequency.

6. The arrangement synchronizes itself automatically.

7. The means required for synchronization are very simple at the transmitter and receiver ends.

In order that the invention may be more clearly understood and readily carried into effect, it will now be described more fully with reference to the accompanying drawing, in which Fig. 1 shows a multiplex transmitter according to the invention adapted for pulse-phase modulation transmission.

Figure 2:
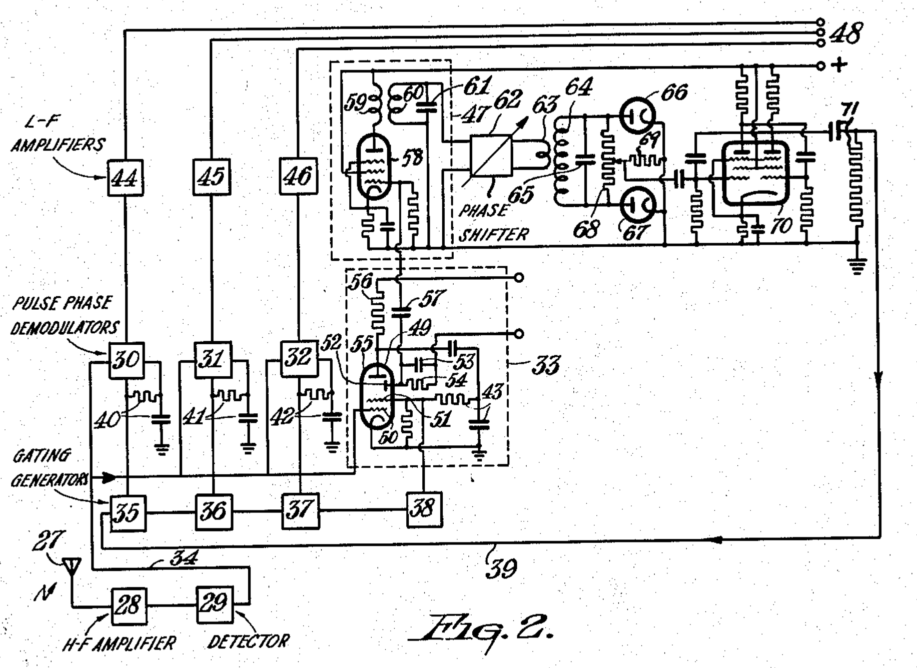
Figure 3:
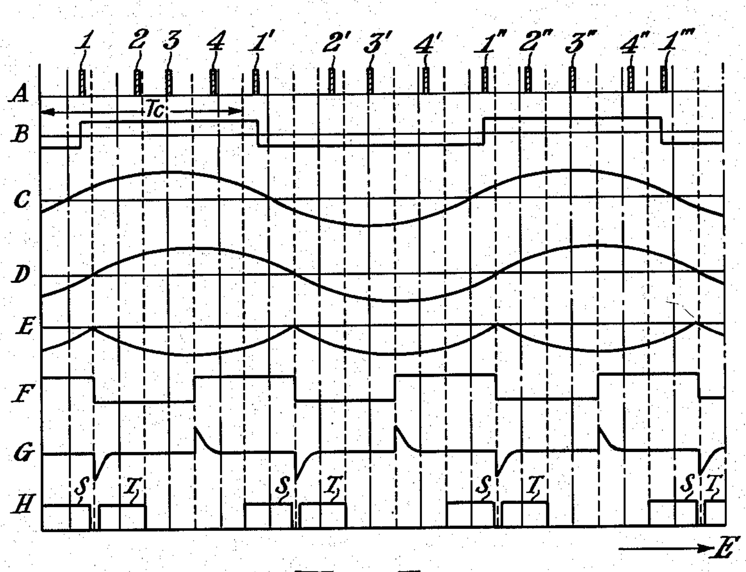

Fig. 2 shows a multiplex receiver according to the invention for use in the aforesaid system, whereas Fig. 3 shows some few time diagrams to explain more fully the operation of the multiplex transmitter and receiver shown in Figs. 1 and 2.

The multiplex transmitter shown in Fig. 1 comprises four transmission channels 1 to 4, of which channel 1 serves to transmit synchronizing pulses, whereas the others constitute, for example, speech channels, the input terminals of which are denoted separately at 5.

The transmission channels are released alternately in the rhythm of the so-called cycle frequency, once during each system cycle, by pulse-like voltages (gating pulses) supplied by a number of gating-pulse generators 6 to 9, the number of which corresponds with the number of channels and each of which supplies one of the pulses of a series of gating pulses. The series of gating-pulse generators 6 to 9 is rendered operative in the rhythm of the cycle frequency by synchronizing pulses of cycle frequency which are supplied through a conductor 10 to the first pulse generator 6 from a pulse generator 11. The pulse generator 11 operates as a frequency-division device (ratio 1:4) for pulses of a recurrence frequency corresponding to the cycle frequency which are supplied by a pulse generator 12. The pulse generator 12 is synchronized by sine voltage of cycle frequency supplied by an oscillator 13.

Upon each occurrence of a cycle-synchronization pulse, the gating-pulse generators 6 to 9 invariably excite one another in succession, the termination of the gating pulses being initiated by switching pulses supplied in parallel combination to all the pulse generators through a conductor 14. The latter pulses, which occur in the rhythm of the cycle frequency, are obtained from the above mentioned pulse generator 12.

The amplifiers 1 to 4, to which the speech and synchronisation signals to be transmitted are supplied, are connected at their output ends to pulse-phase modulators 15 to 18 respectively. The pulse-phase modulators have supplied to them a mixing voltage which varies linearly with time and with the use of which the signals to be transmitted are converted into pulse-phase modulations in a manner known per se.

The pulse-phase modulators 15 to 18 may, for example each, comprise an amplifying tube connected as a pulse generator and normally cut off by a negative bias voltage, said tube having two control-grids to which the intelligence signal and the mixing voltage are supplied respectively.

The mixing voltage, which varies linearly with time, is obtained preferably by integration of the gating pulses occurring in the channel concerned, as described more fully in the copending U. S. patent application S. N. 9,167 filed February 18, 1948. For this purpose integrating networks 19 to 22 are connected to the gating-pulse generators 6 to 9.

The modulation voltage of the synchronizing pulses, the frequency of which corresponds to a subharmonic of the cycle frequency, in the present instance half the cycle frequency, and exceeds the highest frequency of the speech signals which is required to be transmitted, is obtained in the embodiment shown by way of example, from an oscillator 23, which supplies a sine voltage and which is stabilized at the cycle frequency by the pulse generator 11. In order to prevent transmission of speech-signal frequencies of a frequency corresponding to the synchronizing signal, which at the receiver end may give rise to influencing of the synchronisation by the intelligence signals, each speech channel may be provided with a low bandpass filter the cut-off frequency of which is lower than the frequency of the synchronizing signal.

Fig. 3A shows, in a time diagram, the pulses obtained from the pulse modulators 15 to 18, for a duration corresponding to three cycle periods ($T_c$=100 $\mu$sec.). One cycle period is subdivided into four equal channel periods ($T_k$=25 $\mu$sec.), in each of which the first comprises the synchronizing pulses 1, 1′, 1″, 1‴, designated by cross-hatches, and the others are formed by speech signal pules 2, 3, 4, 2′ and so forth. The synchronizing and speech-signal pulses have a constant duration of, for example, 0.5 $\mu$sec. and characterize the transmitted speech and synchronizing signals by their phase shift with respect to the centres, indicated by dot-and-dash lines, of channel periods circumscribed by dash-lines. The synchronizing pulses are distinguished from the signal pulses by their modulation, which corresponds to half the cycle frequency (5000 c./s.) which exceeds the highest speech-signal frequency to be transmitted, which is, for example, 3400 c./s.

At the output end the pulse modulators 15 to 18 are connected in parallel with an amplitude modulator 24, to which a carrier wave from a high-frequency oscillator 25 is supplied for modulation. The modulated oscillations are radiated by an aerial 26.

Fig. 2 shows a multiplex receiving device according to the invention for the reception of signals which are transmitted, for example, by the transmitting device shown in Fig. 1, and which represent three speech signals and one synchronizing signal. Thus, four phase-modulated pulses are received in each transmission cycle.

The pulses received by an aerial 27 are fed, if necessary, after high-frequency amplification and amplitude deflection (28) by way of a pulse repeater 29 and a conductor 34, to pulse-phase demodulators 30 to 33 included in the various receiving channels and normally cut off by a high negative bias voltage.

The repeated pulses essentially correspond to the pulses obtained from the pulse-phase modulators 15 to 18. For a duration corresponding to three cycle periods they may, consequently, be illustrated in the manner shown in Fig. 3A.

Considering the position in which the desired synchronism between the operations of the transmitting and the receiving devices exists, the pulse-phase modulators 30 to 33 are successively released in agreement with the corresponding transmitting channels by series of gating pulses from gating-pulse generators 35 to 38, the number of which corresponds to the number of channels and which excite one another in succession, each in turn supplying one of the gating pulses.

The series of gating-pulse generators is brought into operation in the rhythm of the cycle frequency by synchronizing pulses of cycle frequency which are fed through conductor 39 to the first pulse generator 35 and which are taken from the synchronizing channel to be described hereinafter.

By integration of the gating pulses operative in the channels by means of integrating networks 40 to 43 a mixing voltage, which varies linearly with time, is produced in each of the channels and is used to effect the conversion of the phase modulation of the pulses into amplitude variations of speech signals and synchronizing signals. The speech and synchronizing signals obtained from the pulse-phase demodulators are fed to a series of low-frequency amplifiers 44 to 47. The speech channels comprise the low-frequency amplifiers 44 to 46 and their separate output circuits 48, whereas the low-frequency amplifier 47 in the synchronizing channel comprises an output transformer 59 whose secondary 60 to 61 is tuned to the synchronizing signal of half cycle frequency.

The operation of the identical pulse-phase demodulators 30 to 33 will now be described more fully with reference to the pulse-phase demodulator 33 of the synchronizing channel which demodulator is shown in detail.

The pulse-phase demodulator 33 includes a secondary emission tube 49, which comprises a control-grid 50, to which the phase modulated pulses are fed, a screen grid 51 used as the second control-grid and to which the gating pulses are fed, an auxiliary cathode 52, which emits secondary electrons and which is connected through an auxiliary-cathode resistance 54 shunted by a condenser 53, to a positive voltage source, and an anode 55 which is connected to an anode resistance 56.

In the pulse-phase demodulator use is made of a particular property of a secondary-emission tube, this property being as follows: if the anode potential is lower than the auxiliary-cathode potential, secondary electrons released from the auxiliary cathode will return for the greater part to the auxiliary cathode, so that a positive auxiliary-cathode current occurs. However, if the anode potential exceeds the auxiliary-cathode potential, more secondary electrons will leave the auxiliary cathode than there are primary electrons impinging upon it, so that a negative auxiliary-cathode current occurs. If a lower anode supply voltage is used for the auxiliary cathode than for the anode and the auxiliary-cathode lead comprises a resistance which is high compared with the anode resistance, there will be a state of equilibrium due to the aforesaid conversion of the polarity of the auxiliary-cathode current, such that the auxiliary-cathode potential has always a value which substantially corresponds to the anode potential. In the case of a low time constant for the current-carrying auxiliary-cathode circuit adjustment of this state of equilibrium occurs correspondingly rapidly. If the tube is cut off, the auxiliary-cathode potential will, however, not be able to follow modifications of the anode potential.

If the mixing voltage, which is derived from the gating pulses with the use of an integrating network and which varies linearly with time, is thus directly fed to the anode of the demodulation tube and if provision is made for the tube to pass current only at a signal pulse occurring during a gating pulse, the auxiliary-cathode potential is given, in the case of a low time constant of the conducting auxiliary-cathode circuit, the anode potential which invariably occurs during a signal pulse and hence a potential which varies with the phase of the signal pulse. The time constant of the conducting auxiliary-cathode circuit is determined, inter alia by the anode resistance 56, the auxiliary-cathode resistance 54 and the condenser 53. The tube being cut off, the variation of the auxiliary-cathode potential is determined by the time constant of the auxiliary-cathode resistance 54 and the condenser 53. The use of a high time constant of the last mentioned network ensures that the auxiliary-cathode potential between two signal pulses remains substantially constant.

Owing to the synchronizing pulses, 1, 1′, 1″, 1‴ shown in Fig. 3A, the auxiliary cathode 52 is thus given an alternating voltage of the shape shown in Fig. 3B.

The alternating voltage at the auxiliary cathode 52 of the pulse modulator 33, which is representative of the synchronizing signal transmitted, is fed, through a coupling condenser 57 to a pentode 58 connected as a low-frequency amplifier, the anode circuit of which comprises a transformer 59 having a secondary 60, 61 tuned to the frequency of the synchronizing signal. The tuned secondary has set up across it the synchronizing signal of half cycle frequency, which signal is illustrated in Fig. 3C. Speech frequencies (lower than 3400 c. s) do not produce any appreciable voltage across this tuned circuit.

For the conversion of the synchronizing voltage of half cycle frequency into the desired synchronizing pulses of cycle frequency, which are fed for synchronization through conductor 39 to the first of the series of gating-pulse generators 35 to 38, which excite one another in succession, the synchronizing channel furthermore comprises, connected in cascade, a phase-shifting network 62, which is preferably adjustable, a push-pull rectifier 66, 67 a multivibrator 70 and a discriminating network 71. The function of these elements will now be described more fully.

With the use of the phase-shifting network 62, which is connected to the oscillatory circuit 60, 61, the phase of the synchronizing signal of half cycle frequency may be modified, for reasons to be set out hereinafter, for example, so as to provide the synchronizing signal illustrated in Fig. 3D.

The voltage obtained from the phase-shifting network 62 is fed through a transformer 63 having a secondary 64, 65 tuned to half the cycle frequency, to a push-pull rectifier 66, 67 accurately adjusted to balance with the use of a potentiometer 68. A voltage of the shape shown in Fig. 3E and corresponding in frequency to the cycle frequency occurs across the output resistance 69 of the frequency-doubling push-pull rectifier 66, 67. This voltage is fed to a multivibrator 70 to synchronize it with the cycle frequency. If desired, the rectified voltage of Fig. 3E may be converted by double differentiation into a pulse-like voltage before being fed, as a synchronizing voltage, to the multivibrator, for the purpose of rendering the turn-over instants of the multivibrators more independent of disturbing factors. The output voltage of the multivibrator 70 is shown in Fig. 3F. Upon differentiation with the use of a discriminating network 71 there are produced short pulses of the shape shown in Fig. 3G. Of these pulses those of negative polarity which correspond to the zero passages of the synchronizing voltage shown in Fig. 3D are utilized to excite the series of gating-pulse generators 35 to 38 through the conductor 39 in the rhythm of the cycle frequency.

Fig. 3H shows gating pulses T produced by the first gating-pulse generator 35 and gating pulses S produced by the last gating-pulse generator 38 included in the synchronizing channel.

Under the condition illustrated in Fig. 3 the occurrence of the gating-pulses S is accurately coincident with the synchronizing period of Fig. 3A occurring at the receiver end. The phase-shifting network 62 serves to complete delays which occur in the synchronizing channel and which are in principle constant, to form such a duration that the desired coincidence is ensured.

In the embodiment described the synchronizing pulses produced excite the gating-pulse generator of the speech channel which at any one time becomes operative immediately after the synchronizing channel. It is possible to adjust the phase shift between the voltages shown in Figs. 3C and 3D in such manner that the synchronizing pulses produced are adapted to be used for exciting a different gating-pulse generator, for example that of the synchronizing channel.

In the foregoing we considered the condition in which the receiving channels are released at the correct instants, it being consequently only possible for the synchronizing pulses to occur in the synchronizing channel.

If, for example, on connection of the receiver into circuit the desired synchronisation does not yet occur, the release of the synchronizing and speech channels takes place in the rhythm of the natural frequency of the multivibrator 70. The latter will, in general, slightly diverge from the desired cycle frequency, so that the release-instants of the various receiving channels slowly shift (slip) relatively to the release-instants required in view of the incoming signals.

This condition subsists until the synchronizing pulses occur in the synchronizing channel due to the said slipping and the multivibrator 70 is synchronized with the desired cycle frequency, after which the condition illustrated in Fig. 3 is set up and maintained.

What I claim is:

1. In a pulse communication system for the multiplex transmission of a plurality of distinct intelligence signals, the combination comprising transmitting apparatus including means to generate a train of pulses cyclically at a predetermined rate, means stabilized by said pulse generating means to generate a synchronizing signal having a frequency which is a subharmonic of said predetermined rate, means to modulate one pulse in said train in accordance with the instantaneous amplitude of said synchronizing signal, means to modulate the remaining pulses in said train in accordance with the instantaneous amplitude of the respective intelligence signals, and receiving apparatus for deriving said intelligence signals from said train of modulated pulses including a series of pulse detectors equal in number to the pulses in said train, means to apply said train of modulated pulses to the input of said detectors, gating means cyclically to render said detectors sequentially operative, means including a selective circuit coupled to the detector yielding the synchronizing signal and tuned to the frequency of said synchronizing signal to produce a control voltage, and means to apply said control voltage to said gating means to maintain the cyclical operation of said detectors in accordance with said predetermined rate.

2. In a pulse communication system for the multiplex transmission of a plurality of distinct intelligence signals, transmitting apparatus comprising means to generate a train of pulses cyclically at a predetermined rate, means stabilized by said pulse generating means to generate a synchronizing signal having a frequency which is a subharmonic of said predetermined rate and which exceeds the highest frequency of said intelligence signals, means to modulate one pulse in said train in accordance with the instantaneous amplitude of said synchronizing signal, and means to modulate the remaining pulses in said train in accordance with the instantaneous amplitude of the respective intelligence signals.

3. In a pulse communication system for the multiplex transmission of a plurality of distinct intelligence signals, transmitting apparatus comprising means to generate a train of pulses cyclically at a predetermined rate, means to generate a synchronizing signal having a frequency which is a subharmonic of said predetermined rate and which exceeds the highest frequency of said intelligence signals, means to stabilize said synchronizing signal means with respect to said pulse generating means, means to time-modulate the first pulse in said train in accordance with the instantaneous amplitude of said synchronizing signal, and means to time-modulate the succeeding pulses in said train in accordance with the instantaneous amplitude of the respective intelligence signals.

4. In a pulse communication system for the multiplex transmission of a plurality of distinct intelligence signals, transmitting apparatus comprising means to generate a train of pulses of constant duration and amplitude cyclically at a predetermined rate, means to generate a synchronizing signal having a frequency which is a subharmonic of said predetermined rate and which exceeds the highest frequency of said intelligence signals, means to stabilize said synchronizing signal means with respect to said pulse generating means, means to phase-modulate the first pulse in said train in accordance with the instantaneous amplitude of said synchronizing signal, and means to phase-modulate the succeeding pulses in said train in accordance with the instantaneous amplitude of the respective intelligence signals.

5. In a pulse communication system for the multiplex transmission of a plurality of separate intelligence signals transmitting apparatus comprising means to generate a train of pulses of constant duration and amplitude cyclically at a predetermined rate, means to generate a synchronizing signal having a frequency which is one half of said predetermined rate and which exceeds the highest frequency of said intelligence signals, means to stabilize said synchronizing signal means with respect to said pulse generating means, means to phase-modulate the first pulse in said train in accordance with the instantaneous amplitude of said synchronizing signal, and means to phase-modulate the succeeding pulses in said train in accordance with the instantaneous amplitude of the respective intelligence signals.

6. In a pulse communication system for the multiplex transmission of a plurality of distinct intelligence signals, transmitting apparatus comprising a series of pulse modulators for mixing an input signal with a saw-tooth voltage to produce a pulse having a characteristic depending on the instantaneous amplitude of the applied signal, means to generate a synchronizing signal, a like series of transmission channels the first of which is coupled to the first in the series of said modulators to feed said synchronizing signal thereto, the succeeding channels being coupled respectively to the succeeding modulators for feeding the intelligence signals thereto, said channels being rendered sequentially operative cyclically at a predetermined rate by rectangular gating pulses, means for generating said gating pulses including a like series of pulse generators each producing a rectangular gating pulse in response to an applied triggering voltage, means connecting said generators in cascade relation whereby the actuation of the first generator in said cascade sequentially actuates the succeeding generators, means to apply a triggering voltage to the first generator in said cascade at a rate corresponding to said predetermined rate, means to apply the rectangular pulse developed by each of said generators to a respective channel to render same operative, an integrating network coupled to the output of each of said generators to convert the rectangular pulse produced therein into a saw-tooth voltage, means to apply said saw-tooth voltage to the related modulator for mixing with the signal applied thereto, and a common output line coupled to said modulators whereby a train of signal modulated pulses is formed during each sequential operation thereof, said synchronizing signal having a frequency which is a subharmonic of said predetermined rate, said triggering voltage being also applied to said synchronizing signal means to maintain the desired subharmonic relation between said synchronizing signal and said predetermined rate.

7. In a pulse communication system wherein pulse trains are transmitted cyclically at a predetermined rate, the first pulse in said train having a modulation characteristic depending on the instantaneous amplitude of a synchronizing signal whose frequency is a subharmonic of said predetermined rate and the succeeding pulses in said train each having a characteristic depending on the instantaneous amplitude of a distinct intelligence signal, receiving apparatus comprising a series of demodulators equal in number to the pulses in said train, means to apply said train of modulated pulses to the input of said demodulators, gating means cyclically to render said demodulators sequentially operative, means including a selective circuit tuned to the frequency of said synchronizing signal and coupled to the demodulator yielding the synchronizing signal to produce a control voltage, and means to apply said control voltage to said gating means to maintain the cyclical operation thereof in accordance with said predetermined rate.

8. In a pulse communication system wherein pulse trains are transmitted cyclically at a predetermined rate, the first pulse in said train being time-modulated in accordance with the instantaneous amplitude of a synchronizing signal whose frequency is a subharmonic of said predetermined rate and the succeeding pulses in said train being time-modulated in accordance with the instantaneous amplitude of a distinct intelligence signal, receiving apparatus comprising a series of phase detectors equal in number to the pulses in said train, means to apply said train of modulated pulses to the input of said detectors to recover the signal, gating generator means cyclically to render said detectors sequentially operative, means including a selective circuit tuned to the frequency of said synchronizing signal and coupled to the detector yielding the synchronizing signal to produce a control voltage, and means to apply said control voltage to said gating generator means to maintain the cyclical operation thereof in accordance with said predetermined rate.

9. In a pulse communication system wherein pulse trains are transmitted cyclically at a predetermined rate, the first pulse in said train having a modulation characteristic depending on the instantaneous amplitude of a synchronizing signal whose frequency is one half said predetermined rate and the succeeding pulses in said train having a characteristic depending on the instantaneous amplitude of a distinct intelligence signal, receiving apparatus comprising a series of phase-detectors equal in number to the pulses in said train, means to apply said train of modulated pulses to the input of said detectors, gating generator means cyclically to render said detectors sequentially operative, means to produce a control voltage including a selective circuit tuned to the frequency of said synchronizing signal and coupled to the detector yielding the synchronizing signal, a phase-shifting network coupled to said selective circuit and a push-pull rectifier coupled to said network whereby said control voltage corresponds in frequency to said predetermined rate, and means to apply said control voltage to said gating generator means to maintain the cyclical operation thereof in accordance with said predetermined rate.

10. An arrangement, as set forth in claim 9, wherein said means to apply said control voltage to said gating generator means includes a multivibrator coupled to said rectifier to produce a square wave in synchronism with said control voltage, a discriminator network coupled to said multivibrator to convert said square wave into trigger pulses, and means to apply said trigger pulses to said gating generator means.

CORNELIS JOHANNES HENRICUS ANTONIUS STAAL.

REFERENCES CITED

The following references are of record in the file of this patent:

UNITED STATES PATENTS

| Number | Name | Date |
|---|---|---|
| 1,928,093 | Coyle | Sept. 26, 1933 |
| 2,352,634 | Hull | July 4, 1944 |
| 2,395,467 | Deloraine | Feb. 26, 1946 |
| 2,418,112 | De Rosa | Apr. 1, 1947 |
| 2,418,116 | Grieg | Apr. 1, 1947 |
| 2,428,366 | Gilman | Oct. 7, 1947 |
| 2,429,613 | Deloraine | Oct. 28, 1947 |
| 2,523,703 | Larson et al. | Sept. 26, 1950 |